United States Patent [19]
Moberg

[11] Patent Number: 5,925,386
[45] Date of Patent: Jul. 20, 1999

[54] WEAR-RESISTANT SPRUE BUSHING

[76] Inventor: Clifford A. Moberg, N71 W29922 Tamron La., Hartland, Wis. 53029

[21] Appl. No.: 08/873,150

[22] Filed: Jun. 11, 1997

[51] Int. Cl.⁶ .................................................. B29C 45/17
[52] U.S. Cl. .......................... 425/547; 425/567; 425/569
[58] Field of Search .................................... 425/547, 552, 425/190, 567, 569

[56] References Cited

U.S. PATENT DOCUMENTS

| | | |
|---|---|---|
| 2,828,509 | 4/1958 | Smucker et al. . |
| 3,988,176 | 10/1976 | Watanabe et al. . |
| 4,260,348 | 4/1981 | Graham ..................................... 425/144 |
| 4,386,262 | 5/1983 | Gellert ..................................... 219/424 |
| 4,403,405 | 9/1983 | Gellert . |
| 4,666,396 | 5/1987 | Shaw ....................................... 425/549 |
| 4,950,154 | 8/1990 | Moberg ................................... 425/552 |
| 5,096,410 | 3/1992 | Loulourgas ............................. 425/547 |
| 5,180,594 | 1/1993 | Trakas .................................... 425/547 |

*Primary Examiner*—Tim Heitbrink
*Attorney, Agent, or Firm*—Jansson, Shupe, Bridge & Munger, Ltd.

[57] ABSTRACT

The invention is directed to an improved wear-resistant sprue bushing typically for use in plastic injection molding operations. The sprue bushing has a body member, a nozzle seat and a wear-resistant liner. The sprue bushing shortens cycle times by facilitating cooling and has an increased service life.

14 Claims, 3 Drawing Sheets

WEAR-RESISTANT SPRUE BUSHING

FIELD OF THE INVENTION

This invention is related generally to devices for channeling fluid flow and, more particularly, to devices for use in conveying molten material into a mold.

BACKGROUND OF THE INVENTION

This invention is directed to an improved wear-resistant conduit typically for use in plastic injection molding operations. In the plastics industry such devices are referred to as "sprue bushings." Sprue bushings serve as a conduit for transfer of molten plastic material from an injection molding machine into a mold. Sprue bushings are known in the art and are described in Applicant's U.S. Pat. No. 4,950,154.

A sprue bushing is typically inserted into a corresponding opening in a mold. The mold and sprue bushing are next positioned within a plastic injection molding machine. As the molding cycle takes place, the nozzle seat portion of the sprue bushing mates with a corresponding injection molding machine nozzle tip. Molten material is then discharged from the nozzle tip and through the sprue bushing. The molten material is discharged from the sprue bushing and into the mold filling the mold cavity producing a molded part. Following cooling of the plastic, the mold is opened and the part discharged into a drop box or the like.

The sprue bushing plays an important role in the molding cycle. In addition to serving as a conduit for channelling the molten material from the injection molding machine into the mold, the sprue bushing serves as a heat sink for removing heat from the molten plastic. This heat-transfer process decreases the time needed for cooling of the part before the mold can be opened and the part ejected.

Further, the sprue bushing aids in handling and processing of the molded part through formation of what is known in the industry as a "sprue." A sprue is the hardened plastic portion remaining within the sprue bushing passageway. The sprue forms a stem-like projection on the molded part or is part of the mold runner system.

The sprue is a highly desirable attachment point for automated machines used to sort the part or perform further processing. The sprue could not be used for such gripping purpose if the sprue was molten and soft. Rapid cooling of the plastic used to form the hardened sprue is greatly facilitated by the heat-transfer characteristics of the sprue bushing. Another advantage of rapid sprue cooling is that the sprue does not bond to other parts in the drop box thereby reducing product defects.

Prior art sprue bushings have several disadvantages. One important disadvantage is that the heat-conductive materials used to make the sprue bushings tend to be relatively soft and can degrade as abrasive materials are passed through them. For example, many injection-molded plastics include materials such as glass and talc which are highly abrasive. The wear caused by passing these materials through the bushing will result in irregular widening of the bushing's flow passageway. Uneven passageway wear can cause irregular material flow resulting in inconsistent and incomplete filling of the molds.

Another disadvantage is that excessive wear may cause contamination of the molded products. Contamination may occur when bushing body material is swept into the mold.

The service life of certain prior art sprue bushings may also be shortened particularly when such bushings are used with abrasive materials. For example, a prior art sprue bushing may have a service life of 4000 mold cycles when used with abrasive materials. The required replacement of the sprue bushing results in potentially unnecessary costs to the operator.

A sprue bushing which would make the injection molding process more efficient and cost effective by shortening cycle times, by producing a molded product capable of easy manipulation and processing with few product defects and which would have a long service life notwithstanding exposure to abrasive materials would represent an important advance in the art.

OBJECTS OF THE INVENTION

It is an object of this invention to provide an improved sprue bushing overcoming some of the problems and shortcomings of the prior art.

Another object of this invention is to provide an improved sprue bushing which increases the efficiency and quality of the plastic injection molding process.

It is also an object of this invention to provide an improved sprue bushing which is economical.

Yet another object of this invention is to provide an improved sprue bushing which is rugged and can be used for many mold cycles without degrading thereby avoiding the release of potential contaminants into the mold.

It is a further object of this invention to provide an improved sprue bushing which decreases molding cycle times by facilitating removal of heat from the molten material injected into the mold.

Yet another object of this invention is to provide an improved sprue bushing which may be easily positioned relative to the mold.

These and other important objects will be apparent from the following descriptions of this invention which follow.

SUMMARY OF THE INVENTION

The invention is directed toward an improved sprue bushing particularly for use in injecting a molten plastic material into a mold. The sprue bushing receives molten material from an injection molding machine and provides a passageway for transferring the material into a mold. The sprue bushing includes novel structure designed to avoid abrasion and wear caused by molten materials including abrasive materials such as glass or talc. The heat-transfer characteristics of the sprue bushing aid in the molding process by removing heat from the material thereby reducing cycle times and providing other benefits with respect to further processing of the molded parts.

In a preferred embodiment, the sprue bushing includes a body member made of a heat-conductive material. The body member has first and second ends and a fluid passageway therebetween. The first end receives molten material from the injection molding machine and the second end is for discharging the material into the mold.

The body member may be made through any suitable method such as casting or machining. It is preferred that the body member be formed of copper alloys because of the favorable heat-transfer properties of such material. However, the type of material for use as the body member is not particularly restricted and other heat-conductive material, such as aluminum, may be used. Beryllium-free copper alloy is a most highly preferred material for use as the body member.

The shape of the sprue bushing passageway is also not particularly restricted. In certain preferred embodiments the passageway may be generally conical in cross section and diverge in the direction of material flow therethrough. In other preferred embodiments the passageway may be generally cylindrical in cross section.

Preferred embodiments of the invention include structure for positioning the sprue bushing relative to the mold. Thus, it is preferred that the body member include a stop on its outside surface for positioning the sprue bushing with respect to a mold. It is most highly preferred that the stop is a shoulder.

The inventive sprue bushing further includes a nozzle seat at the body member first end for receiving an injection molding machine nozzle. The nozzle seat is made of a material dissimilar from that of the body member. Stainless steel is a most highly preferred material for use as the nozzle seat. The nozzle seat material has less heat conductivity than the material used to make the body member and serves as a partial barrier to heat transfer from the injection molding machine to the bushing.

The shape of the nozzle seat may vary. It is preferred that the nozzle seat is annular. The nozzle seat is durable and reduces wear caused by contact with the injection molding machine nozzle.

An important aspect of the inventive sprue bushing is the wear-resistant liner attached to the body member and positioned along substantially all of the passageway. The liner is of a material dissimilar from that of the body member and has a hardness greater than that of the body member. The liner resists wear from molten materials containing abrasive constituents.

Preferably, the liner is of a heat-conductive material so that the body member and liner facilitate heat removal from the molten material. Tungsten carbide steel is a most highly preferred material for use as the liner. However, other materials and even coatings are intended to be useful as potential liner materials.

The foregoing and other objects and advantages of the invention will appear from the following description. In the description, reference is made to the accompanying drawings which form a part hereof, and in which there is shown by way of example only a preferred embodiment of the invention. Such embodiment does not necessarily represent the full scope of the invention, however, and reference is made to the claims herein for interpreting the scope of the invention.

DETAILED DESCRIPTION OF THE PREFERRED EMBODIMENTS

Figure 1:
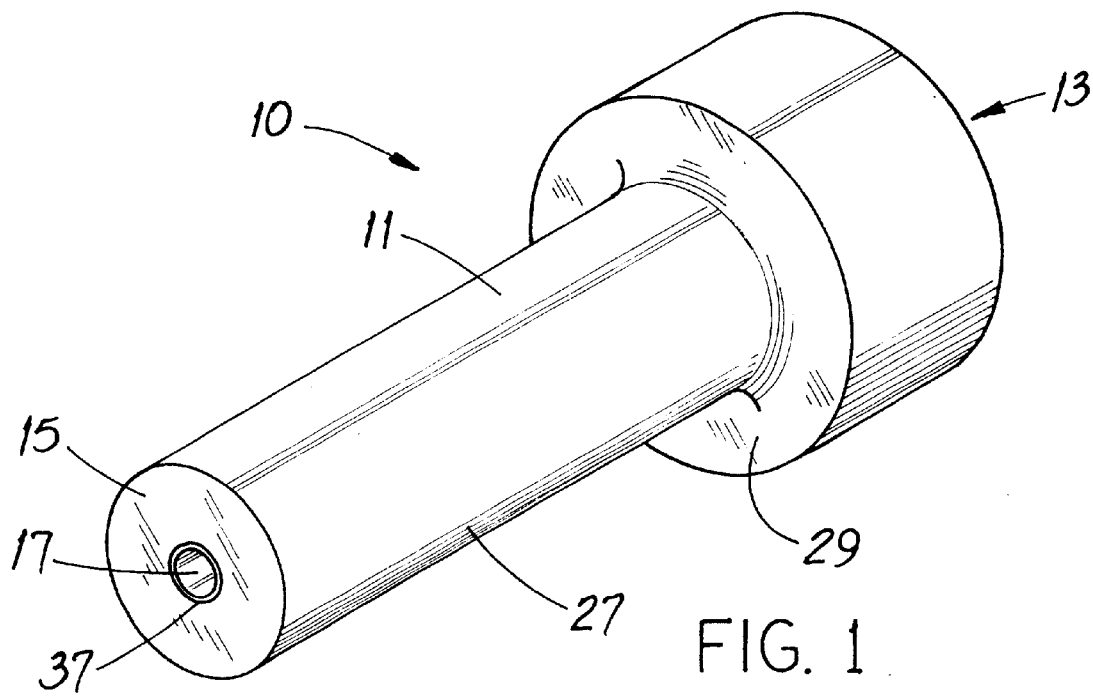
FIG. 1 is a perspective view showing a preferred embodiment of the sprue bushing.

Referring now to the drawings, and more particularly to FIG. 1, there is shown a perspective view of a preferred embodiment of the inventive sprue bushing 10. Sprue bushing 10 includes a body member 11, body member first end 13 and body member second end 15. Body member 11 further includes a fluid passageway 17. Passageway 17 is coextensive with body member 11 and includes a surface 19 and first 21 and second 23 ends. Thus, passageway 17 forms an opening through which molten material is passed through body member 11 and into a mold 25.

Figure 4:
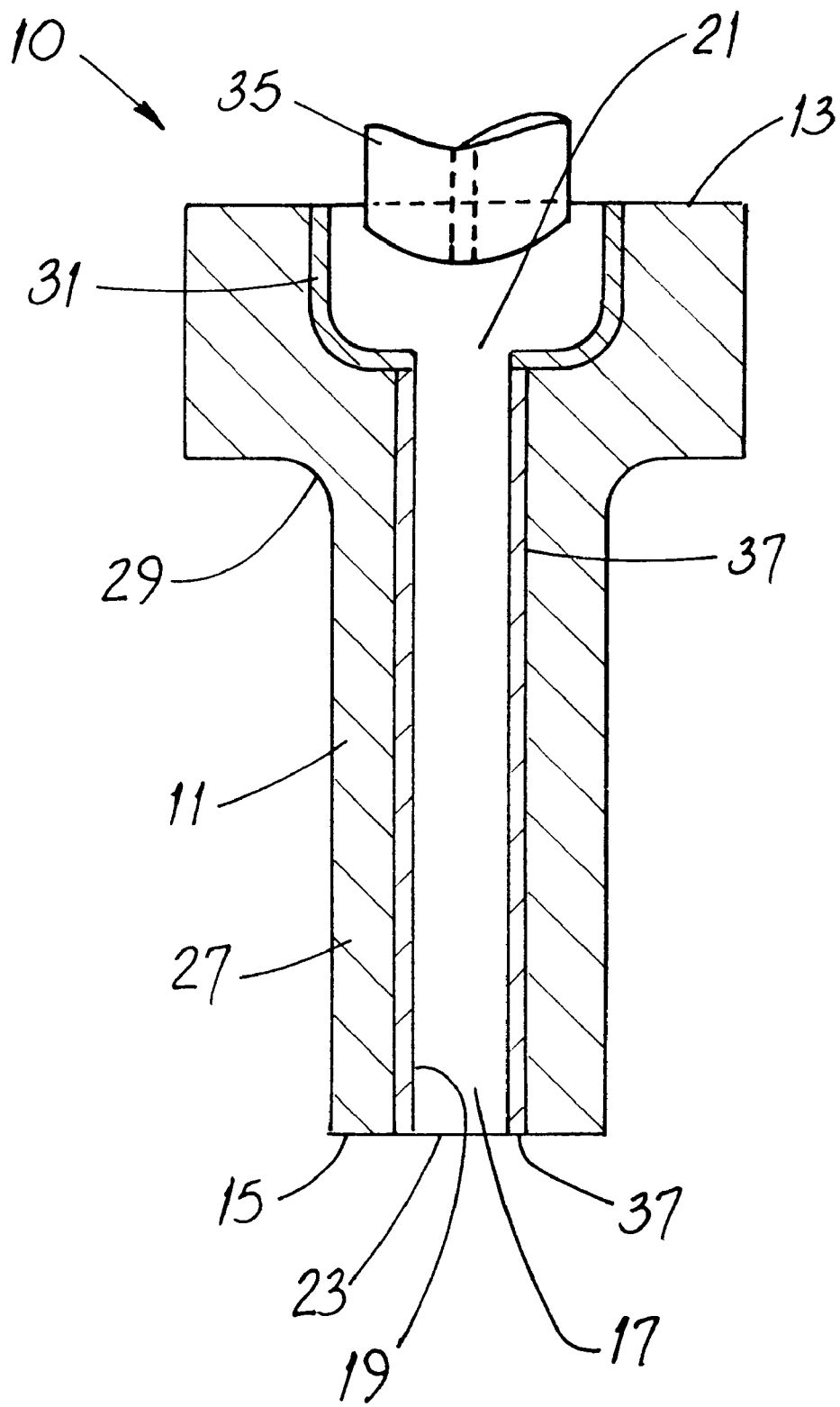
FIG. 4 is a vertical cross-sectional view of a preferred embodiment of the sprue bushing.

As shown in FIG. 4, passageway 17 may be generally cylindrical in cross section. Other suitable passageway 17 shapes, such as conical or helical, are intended to be within the scope of this invention.

Figure 3:
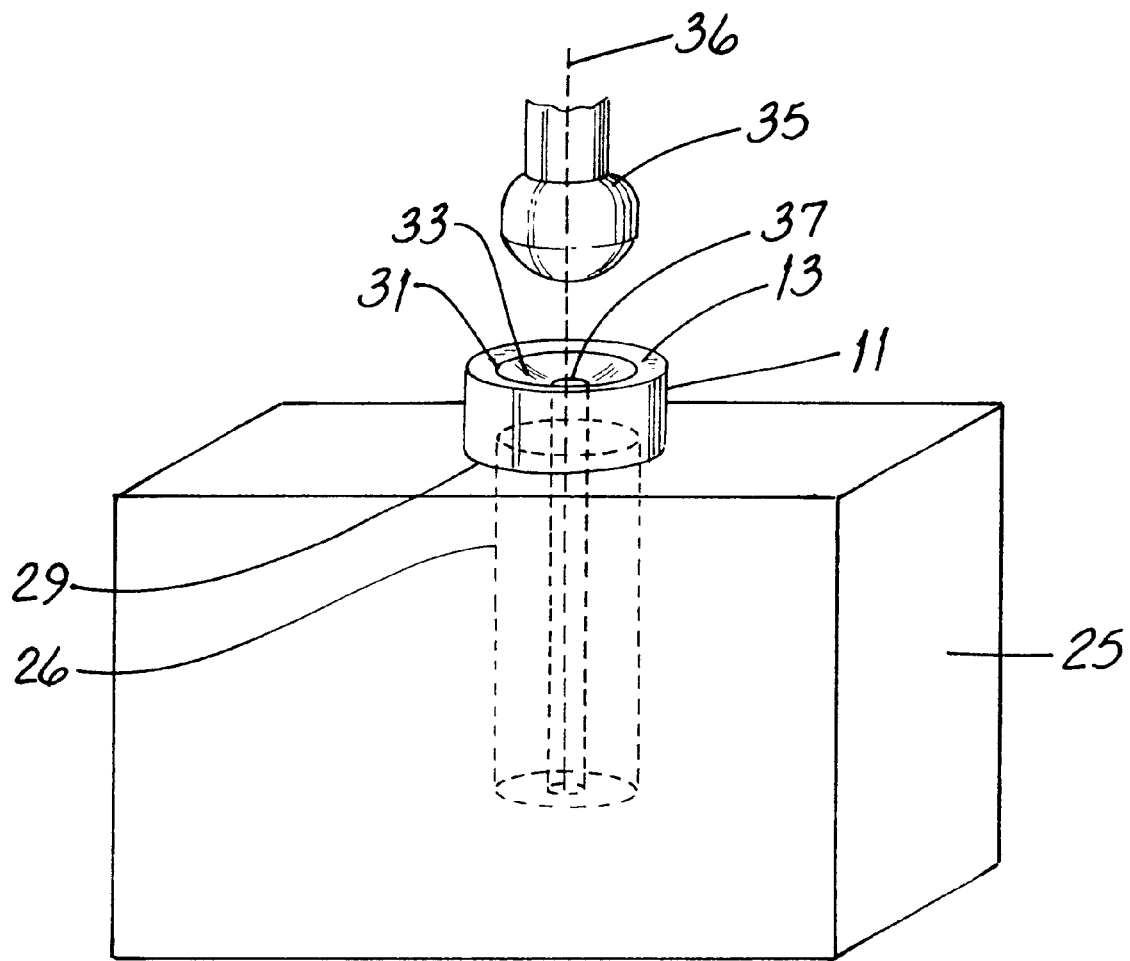
FIG. 3 is a schematic view showing a preferred embodiment of the sprue bushing positioned with respect to a mold and injection molding machine nozzle.

As illustrated in FIGS. 1, 3 and 4, body member 11 may have an elongated portion 27 which is inserted into a corresponding opening 26 in mold 25. Stop member 29 is provided to aid in positioning sprue bushing 10 relative to mold 25. Positioning of sprue bushing 10 with respect to mold 25 is seen, by way of example only, in FIG. 3. The stop member 29 shown in FIGS. 1, 3 and 4 is a shoulder.

Figure 2:
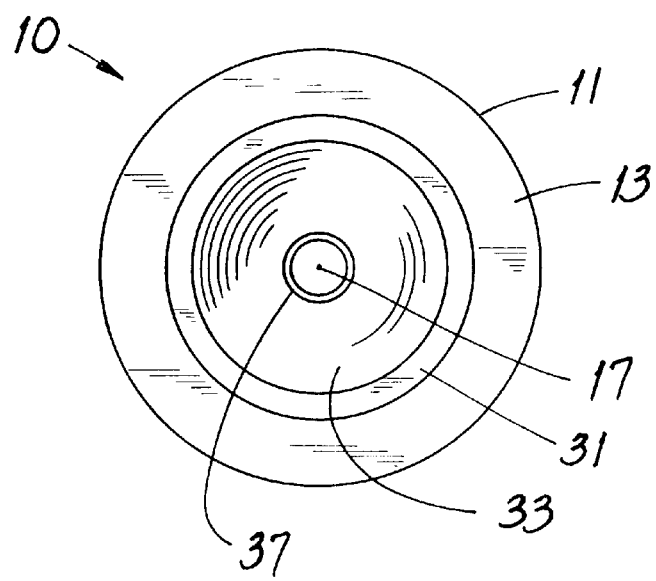
FIG. 2 is a top view of a preferred embodiment of the sprue bushing.

FIGS. 2 and 4 show the nozzle seat 31 of the inventive sprue bushing 10. Nozzle seat 31 is for receiving an injection molding machine nozzle 35. Nozzle seat 31 is positioned at the body member 11 first end 13. Passageway 17 is coextensive with nozzle seat 31. Nozzle seat 31 shown in FIG. 2 is annular. Nozzle seat 31 may include tapered portion 33 for positioning the injection molding machine nozzle tip 35 with respect to body member first end 13.

FIG. 4 best shows liner 37 attached to body member 11 and positioned along substantially all of passageway 17. Liner 37 is in contact with the molten material being moved through sprue bushing 10. Liner 37 prevents degradation of body member 11 caused by abrasive materials (e.g., glass, talc, etc.) in the molten material. Liner 37 prolongs the service life of sprue bushing 10 by preventing passageway 17 from becoming worn and enlarged thereby impairing control of flow of material through the passageway 17. Further, liner 37 prevents fragments of body member 11 material from being swept into the mold 25 potentially contaminating a molded part.

Body member 11 is made of heat-conductive material. The heat-conductive material draws heat from the molten material thereby shortening the cycles. Rapid heat removal is important to efficient operation of the mold cycle.

Copper alloys are particularly preferred for use as the body member 11 material because of the high heat conductivity of such materials. A particularly useful beryllium-free copper alloy is designated C-18000 and is manufactured by Ampco Metal, Inc. of Milwaukee, Wis. (C-18000 includes approximately 96.4% copper, 2.5% nickel, 0.7% silicon and 0.4% chromium.) C-18000 is an excellent heat conductor and has an approximate thermal conductivity of 125 BTU/ft/hr/ft$^2$/°F. However, such material is prone to degradation in applications involving abrasive materials because it has a hardness of approximately 94 on the Rockwell Hardness B Scale. The body member 11 may also be formed of other heat-conductive materials, such as aluminum. The body member may be made by any suitable process such as casting or machining.

Nozzle seat 31 is made of a material dissimilar from that of the body member 11. The material used for nozzle seat 31 has less heat-conductivity than the material used to make the body member and serves as a partial barrier to heat transfer from the injection molding machine. #420 stainless steel manufactured by Crucible Specialty Metals of Chicago, Ill. is particularly suitable for use in making nozzle seat 31 because it is durable and has an approximate thermal conductivity of 7 BTU/ft/hr/ft$^2$/°F—much less than that of the preferred copper alloy for use in making the body member 11. Other suitable materials for use in nozzle seat 31 include tool steels having AISI designations D-2, D-5, A-2 and M-2.

Materials, such as those set forth herein, are durable and reduce wear caused by contact between nozzle seat 31 and the injection molding machine nozzle tip 35. The nozzle seat may be attached to the body member first end 13 by any acceptable method.

Tungsten carbide steels are particularly useful materials for liner 37. Such materials are harder, and thus more wear-resistant, than the highly heat-conductive materials preferred for use as the body member component 11. Such materials, nonetheless, have good heat conductivity. One example of a suitable tungsten carbide steel is designated C-2 and is manufactured by Carbidie Corporation of Irwin, Pa. C-2 has a hardness of about 77.0–80.0 on the Rockwell Hardness C Scale and a thermal conductivity of about 45 $BTU/ft/hr/ft^2/°F$. Other Carbidie products, such as C-9 and C-1, are also suitable for use in making liner 37.

Liner 37 may be constructed and attached to the body member 11 in any suitable manner. In preferred embodiments, liner 37 is a tube attached to the body member passageway 17. In this embodiment, liner 37 is attached to body member 11 by heating body member 11 (thereby expanding the circumference of passageway 17) and inserting liner 37 into passageway 17. The passageway 17 circumference is reduced as the body member 11 cools thereby locking liner 37 in place. Any protruding portions of liner 37 may be removed by appropriate means. This is also an acceptable method by which to attach the nozzle seat 31 to body member first end 13. For instance, a formed seat 31 may be placed into an aperture (not shown) formed in heated body member first end 13. Shrinkage of body member 11 upon cooling locks nozzle seat 31 in place. Liner 37 is not restricted to a pre-made tube and could be of other suitable construction such as a coating applied to passageway 17.

FIG. 3 depicts a sprue bushing placed in position for a typical molding operation. Sprue bushing 10 is inserted into a corresponding opening 26 (shown by phantom lines in FIG. 3) of mold 25 and is held in position by stop 29. Mold 25 is placed in an injection molding machine so that the body member first end 13 and passageway opening 21 are in registry with nozzle tip 35 as shown by the dashed line 36. As the molding cycle begins, nozzle tip 35 is brought into contact with nozzle seat 31 by the injection molding machine and molten material, such as thermoplastic, is discharged from nozzle tip 35 into passageway 17. Liner 37 resists wear caused by any abrasive material in the molten plastic. The molten material passes through the sprue bushing 10 and into mold 25 filling the mold cavity (not shown).

Heat from the molten plastic is drawn away by liner 37 and body member 11 speeding the cooling process. The cycle is typically completed by withdrawing the nozzle tip 35, opening mold 25 and permitting the molded part to fall into a drop box.

The lined passageway 17 of Applicant's invention increases the service life of the sprue bushing and improves control over the molding process by maintaining a constant flow path for the molten material. The heat-transfer characteristics of the body material promote rapid material cooling and shorter cycle times. Applicant's invention makes the molding process more economical by decreasing replacement part costs and reducing costs associated with handling molded product and replacement of defective plastic product.

While the principles of this invention have been described in connection with specific embodiments, it should be understood clearly that these descriptions are made only by way of example and are not intended to limit the scope of the invention.

I claim:

1. A sprue bushing for use in injecting molten material into a mold, the sprue bushing comprising:

a body member made of heat-conductive material and having a body passageway and first and second ends;

nozzle seat at the body member first end for receiving an injection molding machine nozzle, the seat being made of a material dissimilar from that of the body member and having less heat conductivity than that of the body member material; and a liner attached to the body member and having a liner passageway therethrough, the liner being of a material dissimilar from that of the body member, the liner having a hardness greater than that of the body member, thereby configuring the sprue bushing to resist abrasion from molten material flowing therethrough;

and wherein:

the liner has a thermal conductivity greater than that of the nozzle seat, thereby configuring the liner and body member to act as a heat sink with respect to heat in the molten material;

thereby configuring the sprue bushing to resist abrasion from the molten material flowing through the sprue bushing and to facilitate removal of heat from molten material within the sprue bushing.

2. The sprue bushing of claim 1 wherein the liner is of a heat-conductive material so that the body member and liner facilitate heat removal from the molten material.

3. The sprue bushing of claim 2 wherein the heat-conductive material is tungsten carbide steel.

4. The sprue bushing of claim 1 wherein the liner is itself a tube assembled with the body member.

5. The sprue bushing of claim 1 wherein the passageway is generally conical in cross section and diverges in the direction of material flow therethrough.

6. The sprue bushing of claim 1 wherein the passageway is generally cylindrical in cross section.

7. The sprue bushing of claim 1 wherein the body member has an outside surface which includes a stop for positioning the sprue bushing with respect to a mold.

8. The sprue bushing of claim 7 wherein the stop is a shoulder.

9. The sprue bushing of claim 1 wherein the body member material is made of a copper alloy.

10. The sprue bushing of claim 9 wherein the body member material is made of a beryllium-free copper alloy.

11. The sprue bushing of claim 1 wherein the nozzle seat is annular.

12. The sprue bushing of claim 11 wherein the nozzle seat is made of stainless steel.

13. The sprue bushing of claim 1 wherein the body member has an outer surface and the liner is attached to the body member.

14. The sprue bushing of claim 13 wherein the body member outer surface is coating-free.

\* \* \* \* \*

UNITED STATES PATENT AND TRADEMARK OFFICE
CERTIFICATE OF CORRECTION

PATENT NO. : 5,925,386
DATED : July 20, 1999
INVENTOR(S) : Clifford A. Moberg

It is certified that error appears in the above-identified patent and that said Letters Patent is hereby corrected as shown below:

In column 6, line 11, insert --a-- before "nozzle" at the beginning of the line.

Signed and Sealed this

Fifth Day of September, 2000

Attest:

Q. TODD DICKINSON

*Attesting Officer*　　*Director of Patents and Trademarks*